United States Patent [19]
Lyons, Jr. et al.

[11] 3,800,086
[45] Mar. 26, 1974

[54] AUTOMATIC SYNC DETECTOR

[75] Inventors: Joseph B. Lyons, Jr.; Francis P. Darreff, both of Philadelphia, Pa.

[73] Assignee: The United States of America as represented by the Secretary of the Navy, Washington, D.C.

[22] Filed: Sept. 30, 1964

[21] Appl. No.: 400,609

[52] U.S. Cl. .................... 178/69.5 R, 340/146.1 D
[51] Int. Cl. .............................................. H04l 7/00
[58] Field of Search .............. 325/58; 178/22, 69.5; 340/146.1; 179/15 BS

[56] References Cited
UNITED STATES PATENTS

| | | | |
|---|---|---|---|
| 3,113,291 | 12/1963 | Fiske | 325/58 |
| 3,127,475 | 3/1964 | Coulter | 179/15 |
| 3,144,515 | 8/1964 | Kaneko | 179/15 |
| 3,180,927 | 4/1965 | Heppe | 178/5.1 |
| 3,305,636 | 2/1967 | Webb | 178/69.5 R |
| 3,706,933 | 12/1972 | Bidell et al. | 178/69.5 R |

*Primary Examiner*—Maynard R. Wilbur
*Assistant Examiner*—H. A. Birmiel
*Attorney, Agent, or Firm*—G. J. Rubens; Henry Hansen; W. C. Everett

EXEMPLARY CLAIM

1. An automatic synchronization means in combination with a code searching mechanism for synchronizing a generated code sequence with a received code sequence, comprising:
  a first code generator for providing a first code sequence; a first code searching mechanism receiving said first code sequence and the received code sequence, said mechanism comparing said first generated code sequence bit by bit with said received code sequence and for issuing a signal output of one type upon matching of said bits and the opposite type upon mismatch;

means for integrating the output of said first code searching mechanism for issuing a signal proportional to the degree of correlation of said code sequences;
means for sensing correlation above a predetermined level on said integrating means and for issuing a correlation signal in response thereto, said sensing means issuing a non-correlation signal when the signal from said integrating means is below said predetermined level;
a data coder receiving said first generated code sequence; and
means responsive to a correlation signal from said sensing means for interrupting said first code search mechanism, said means responsive to a correlation signal including:
a first AND gate connected to receive said correlation signal;
a second AND gate connected to interrupt the operation of said first code searching mechanism in response to an inhibiting signal;
a third AND gate having an input connected to the output of said first AND gate for issuing an output to said data coder;
a flip-flop having an input connected to the output of said third AND gate;
means providing a signal to another input of said flip-flop for initially enabling said first and second AND gates;
said flip-flop issuing said inhibiting signal to said second AND gate upon incidence of a correlation signal, whereby the operation of said first code searching mechanism is interrupted.

3 Claims, 3 Drawing Figures

AUTOMATIC SYNC DETECTOR

The invention described herein may be manufactured and used by or for the Government of the United States of America for governmental purposes without the payment of any royalties thereon or therefor.

In application Ser. No. 370,741 of Bruce R. Meuron and Joseph B. Lyons, Jr. for Data Link and Return Link, filed May 27, 1964, there was disclosed an air-to-surface missile system using digital data coding for communication between the aircraft and missile. There was disclosed and claimed a code searching mechanism which was used to synchronize a code generator in one with a corresponding code generator in the other. The present invention provides means in the aircraft for shutting off the code searching mechanism as soon as synchronization has been achieved, and means in the missile for sensing loss of synchronization and reconnecting the code searching mechanism to resynchronize the missile with the aircraft.

In the above described application, a set time relay was provided which shut off the code searching mechanism after a specified period, generally 1 to 2 seconds. Although the code searching mechanisms will generally be effective to synchronize the code generators within that time, there are occasions, for example, under heavy interference conditions, when synchronization will not be achieved within that time. If synchronization has not been achieved when the code searching mechanism is shut off, the operator must manually reinitiate the code searching function with its attendant delay. On the other hand, if the code searching mechanism is kept in operation throughout the operation of the device, it may inadvertently take the mechanism out of synchronization when interference momentarily gives an indication that synchronization has been lost. It is also necessary when synchronization is lost in the missile for the operator to send a manual signal to the missile causing it to resynchronize. This also requires a fixed time delay, which is time consuming.

The general purpose of this invention is to provide a synchronization sensing means in the aircraft which senses when synchronization has been achieved and shuts off the code searching mechanism in response thereto. To achieve this, the present invention provides an integrator and Schmitt trigger connected to the resync correlator, the output of the Schmitt trigger operating a relay driver which operates to disconnect the code searching mechanism. In the missile there is also provided a synchronization sensing means which will disconnect the code searching mechanism upon receiving a signal from the aircraft indicating synchronization and will automatically reconnect the code searching mechanism when the signal from the aircraft is lost for any reason.

Accordingly, it is an object of the present invention to provide a synchronization sensing means to shut off the operation of a code searching mechanism in a data communication system.

Another object of the invention is to provide remote means for automatically reinitiating synchronization when synchronization is indicated to be lost.

Other objects and many of the attendant advantages of this invention will be readily appreciated as the same becomes better understood by reference to the following detailed description when considered in connection with the accompanying drawings in which like reference numerals designate like parts throughout figures thereof and wherein.

Figure 1:
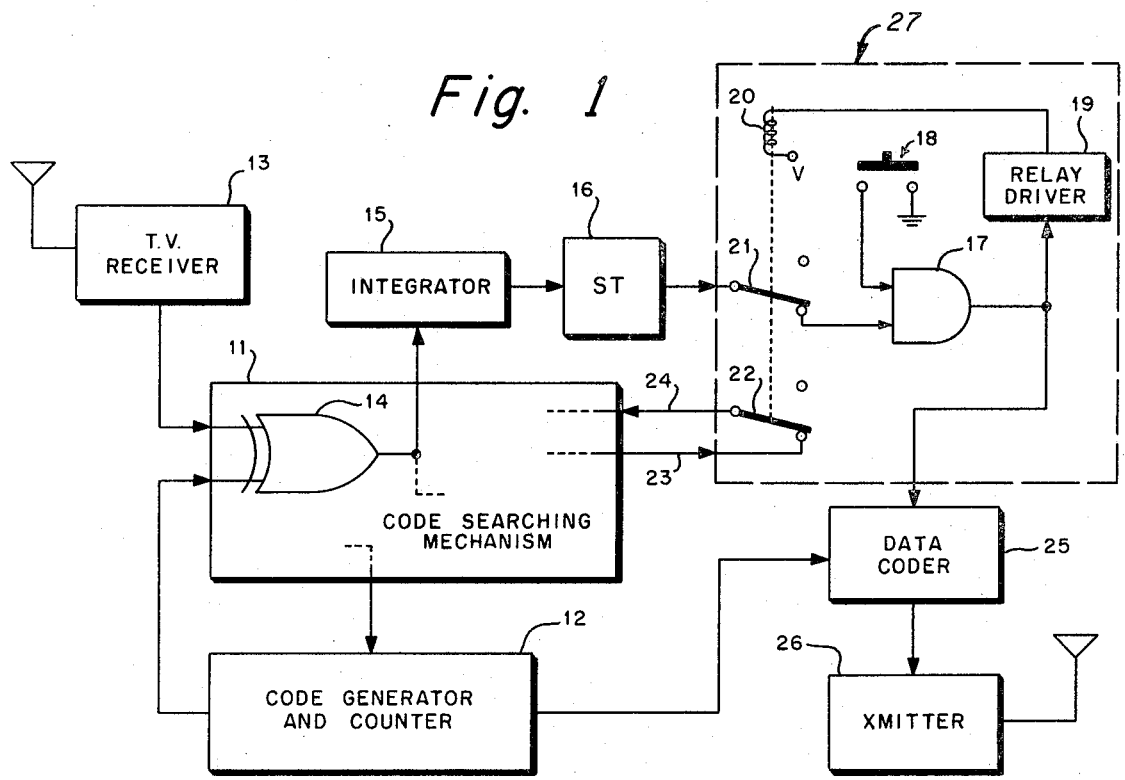
FIG. 1 shows an automatic synchronization sensing means in an aircraft according to the present invention.

In FIG. 1 are shown a code searching mechanism 11 and code generator and counter 12. Code generator 12 sends a code sequence to code searching mechanism which also receives an incoming code sequence from a TV receiver 13. The incoming code sequence and the code sequence from code generator 12 are compared in code searching mechanism 11 by a resync correlator 14. This resync correlator 14, as its symbology indicates, is an Exclusive OR gate which gives an output of one polarity if the two signals match and an output of the opposite polarity if the signals do not match. The code searching mechanism 11 takes the output of resync correlator 14 and uses it to control the operation of code generator and counter 12 to synchronize the code sequence from generator 12 with the incoming code sequence from TV receiver 13. The operation of the code searching mechanism is described in detail in the above cited application of Meuron and Lyons. The output of Exclusive OR gate 14 is also sent to an integrator 15. If the outputs from Exclusive OR gate are mixed, indicating non-correlation, the net charge on integrator 15 will tend to be substantially zero. When synchronization occurs, the output from Exclusive OR gate 14 will tend to be all of one polarity, which will cause a net charge to accumulate on integrator 15. When the charge on integrator 15 is above a specified level, a Schmitt trigger 16 responding to that level will give a logic "1" as an output. As long as the charge on integrator 15 is below that level, Schmitt trigger 16 will issue a logic "0." The logic signal from Schmitt trigger 16 is fed into a connecting means 27 containing an AND gate 17, which has a second input from ground through a push button 18. As long as the push button 18 is open the signal therefrom into AND gate 17 is a logic "1." When push button 18 is closed, a logic "0" is inserted into AND gate 17, shutting it off. The output of AND gate 17 is fed into a relay driver 19 which controls the operation of a relay 20 which opens and closes switches 21 and 22. Switches 21 and 22 are shown in their closed position, which is the natural position in the absence of any signal into relay 20. When relay 20 is actuated, both switches 21 and 22 are opened. Switch 21 controls the passage of the pulse from Schmitt trigger 16 into AND gate 17, and when switch 21 is open there is a "1" into that portion of AND gate 17. Opening switch 22 breaks line 23 from line 24, thereby interrupting the passage of pulses from one portion of the code searching mechanism to another and shutting off the code searching mechanism 11. The output from AND gate 17 is also sent to a data coder 25 which receives also other data information, not shown. Data information fed into data coder 25 is coded by coding and timing information from code generator and counter 12 and this coded information is sent to transmitter 26 for transmitting to the missile.

Figure 2:
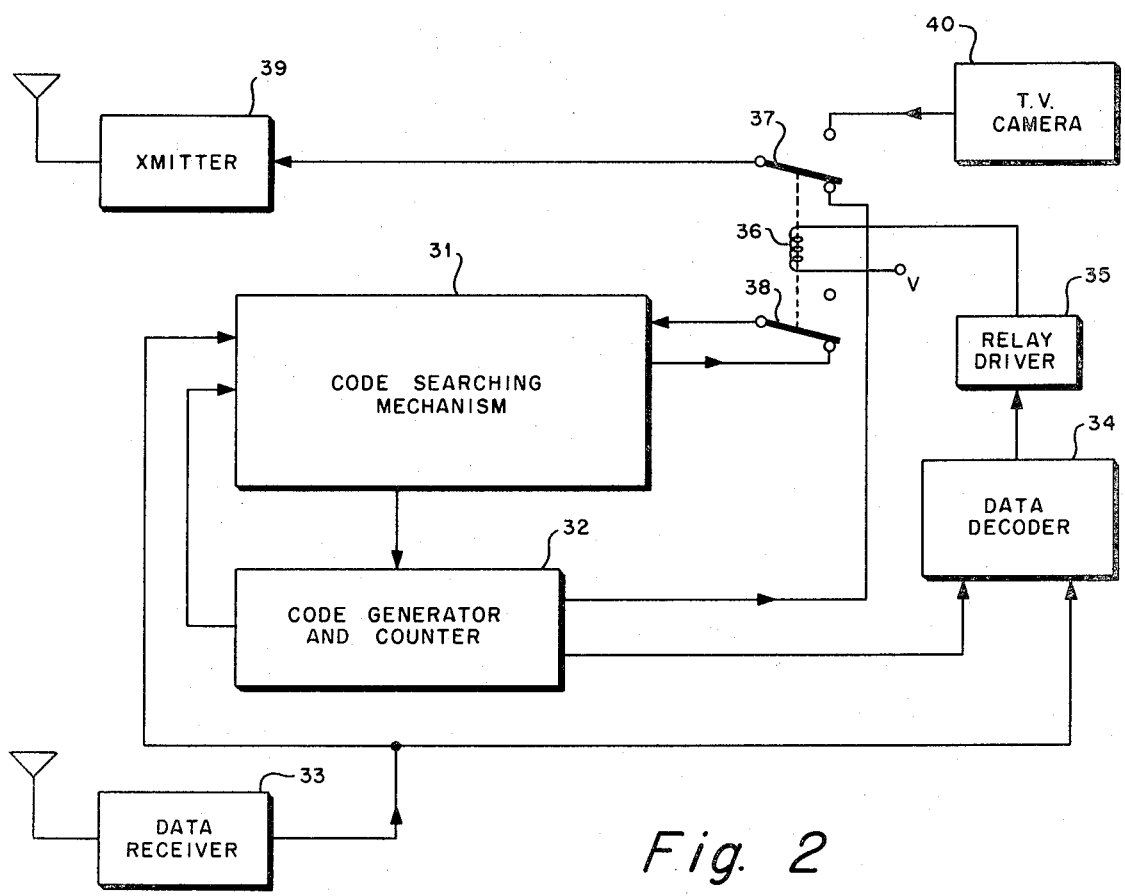
FIG. 2 shows an automatic synchronization sensing means and automatic resync means in a missile according to the present invention.

In FIG. 2 is shown a code searching mechanism 31 like code searching mechanism 11 in the aircraft. Also there is provided a code generator and counter 32 similar to code generator and counter 12 in the aircraft. Generator 32 sends a code sequence to code searching mechanism 31 which also receives a code train from a data receiver 33 which receives the transmitted signal from the aircraft. Data receiver 33 also sends its received data signal to a data decoder 34 which receives a generated code sequence from code generator 32. The operation of the data decoder 34 is described in greater detail in the above cited application of Meuron and Lyons. At the appropriate slot of the code sequence, data decoder 34 sends a logic signal to a relay driver 35 which controls the operation of a relay 36 which in turn controls the operation of a pair of switches 37, 38. When a logic "0" is sent from the data decoder 34 to the relay driver 35, no signal is sent through the relay 36 and switches 37 and 38 are in the lower positions as shown. When a logic "1" comes from data decoder 34 to relay driver 35, relay driver 35 activates relay 36 to raise switches 37 and 38 to their upper positions. When switch 37 is in its lower position it passes a code sequence from code generator 32 to a transmitter 39. When switch 37 is in its upper position, it passes to the transmitter 39 the video signal from a TV camera 40. When switch 38 is raised from its lower to its upper position it opens a connection in the code searching mechanism 31 thereby shutting it off.

The operation of the synchronizing means is as follows. Initially the switches 21 and 22 in the aircraft are closed and switch 18 is open. In the absence of any correlation between the incoming signal from TV receiver 13 and the generated code sequence from generator 12, the net charge on integrator 15 will be close to zero. The output from Schmitt trigger 16 will therefore be a "0" which will inhibit AND gate 17 and hold back the operation of relay driver 19. Switches 21 and 22 will then remain closed so long as the output of Schmitt trigger 16 is "0." When code searching mechanism 11 has caused synchronization between the incoming signal and the generated signal from generator 12, the charge on integrator 15 will rise to a predetermined value and Schmitt trigger 16 in response thereto will give a "1" output. Since the input from button 18 is a "1" when it is open, the output of AND gate 17 will therefore be a "1." A "1" into relay driver 19 will actuate the relay 20 causing switches 21 and 22 to open, thereby cutting off the code searching mechanism and interrupting any further signals from Schmitt trigger 16. The inputs into AND gate 17 are such that when switch 21 is open that input into AND gate 17 also is a "1," thereby retaining a "1" input into relay driver 19. The same "1" from AND gate 17 is sent to the data coder 25, which codes it by means of a code sequence from code generator 12 and transmits it in the proper slot to transmitter 26 for transmission to the missile. The "1" or "0" which is thus broadcast to the missile is the signal to the missile which indicates synchronization or non-synchronization. If the operator in the aircraft senses, by means of his TV screen, a non-synchronized condition, which will occur if anything operates to interrupt the synchronization of the system for any reason, he can cause the synchronizing means to re-initiate by pushing button 18. It puts a "0" into AND gate 17, which shuts off the relay driver 19, which causes switches 21 and 22 to close again, reconnecting the code searching mechanism 11 and the Schmitt trigger 16.

In the missile, switches 37 and 38 are initially closed. Code searching mechanism 31 will compare the incoming signal from data receiver 33 with the code generator sequence from generator 32. This will continue so long as switch 38 remains closed. Generator 32 also sends to the data decoder 34 a sequence for the purposes of decoding the incoming code sequence and in the proper slot a signal is sent to the relay driver 35 which comprises the "1" or "0" which was sent to the data coder 25 in the aircraft. Assuming initial non-synchronization, this will continue to be a "0." As soon as synchronization is sensed in the aircraft and a "1" is transmitted, a "1" will be passed to the relay driver 35 in the missile operating the relay 36 and opening switches 37 and 38. Switch 38 will then cut off the code searching mechanism 31 while switch 37 will connect the video signal from the TV camera 40 to the transmitter 39. If for any reason synchronization is interrupted anywhere in the system, relay driver 35 will cease to receive a "1" from data decoder 34. This will cause switches 37 and 38 automatically to resume their lower position disconnecting the TV camera and reconnecting the code searching mechanism 31. The operation of this in the missile is automatic.

The switches and relays in connecting means 27 shown in FIG. 1 represent the most economical means for connecting and disconnecting the code searching mechanism 11. However, if it is desired to use exclusively digital logic circuitry, connecting means 27' shown in FIG. 3 may be substituted in FIG. 1 for connecting means 27. The pulse from the code searching mechanism 11 passes through line 23 to an AND gate 51 and the output of that AND gate 51 passes back along line 24 into the code searching mechanism. The output from Schmitt trigger 16 passes into a second AND gate 52, the output of which passes to a third AND gate 53. AND gates 51 and 52 receive second inputs from the "1" position of a flip-flop 54 which is reset by the output of AND gate 53. Flip-flop 54 is set by the output of an OR gate 55 which has as inputs signals from a voltage through a push button 56 and from the power on switch through an RC coupling 57, 58. Push button 56 normally is grounded through resistance 59. Push button 56 also provides an input into AND gate 53. The output of this circuitry to the date coder 25 is taken from the output of AND gate 53.

The operation of this circuitry is as follows: Whenever the power is turned on, a pulse is sent through the RC coupling 57, 58 to OR gate 55 which passes the pulse on to the set point of flip-flop 54. This means that flip-flop 54 will always be set on "1" initially, thereby enabling initially both AND gates 51 and 52. Assuming that the output of Schmitt trigger 16 is initially "0," AND gate 52 will be actuated. The output of AND gate 52 when actuated is a "0" as indicated, thereby disabling gate 53. With AND gate 51 enabled by the "1" from flip-flop 54, any pulses coming from code searching mechanism 11 through line 23 will be passed back to the code searching mechanism 24. So long as push button 56 is not in operation, there will be a "1" from that switch into AND gate 53 and AND gate 53 will be enabled. As soon as Schmitt trigger 16 produces a "1," indicating synchronization, AND gate 52 will be disabled causing a "1" output from that gate which will be passed through AND gate 53 to the reset point of flip-flop 54. When flip-flop 54 is reset, both AND gates 52 and 51 will be disabled thereby cutting off all pulses back to code searching mechanism 11 through AND gate 51 and causing a continual "1" output from AND gate 52. A "1" output into AND gate 53 will be continually passed out to the reset point of 54 and to the data coder indicating synchronization. If at any time the operator wishes to reconnect the synchronizing mechanism he may push button 56 which passes a pulse into the set point of flip-flop 54 through OR gate 55. This also grounds the input into AND gate 53, temporarily disabling that gate. Flip-flip 54 will then stay on the "1" position until a "1" from Schmitt trigger 16 again disables AND gate 52, whereupon the code searching mechanism 11 will be shut off by disabling of gate 51 as before. It will be seen therefore that the circuitry of FIG. 3 is the functional equivalent of the circuitry in dotted lines in FIG. 1.

Figure 3:
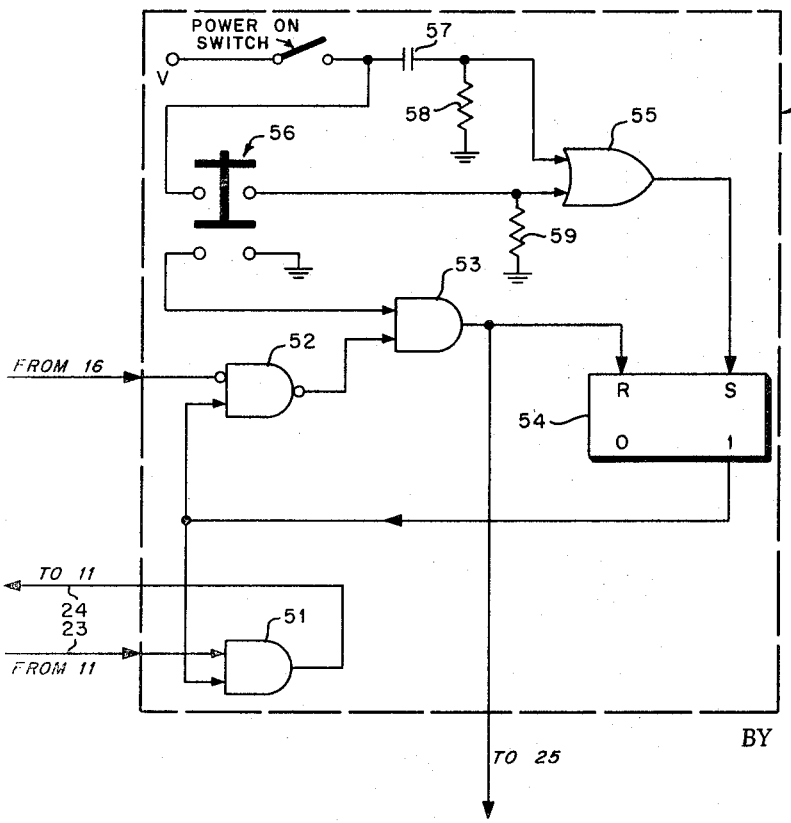
FIG. 3 shows an alternative connecting means in the aircraft of FIG. 1.

As an alternative, the output in FIG. 3 to coder 25 may be taken from the "0" point of flip-flop 54, which is high when flip-flop 54 is reset. In that event, gate 52 may be a normal AND gate.

It will be understood that the voltages shown may be either positive or negative voltages and that the "1's" and "0's" mentioned in the description may refer either to positive or negative voltages, or to voltages of opposite polarity, or to voltages of one polarity and ground, as will be obvious to a person skilled in the art. It will also be understood that various changes in the details and arrangement of parts which have been herein described and illustrated in order to explain the nature of the invention may be made by those skilled in the art within the principle and scope of the invention as expressed in the appended claims.

What is claimed is:

1. An automatic synchronization means in combination with a code searching mechanism for synchronizing a generated code sequence with a received code sequence, comprising:
   a first code generator for providing a first code sequence; a first code searching mechanism receiving said first code sequence and the received code sequence, said mechanism comparing said first generated code sequence bit by bit with said received code sequence and for issuing a signal output of one type upon matching of said bits and the opposite type upon mismatch;
   means for integrating the output of said first code searching mechanism for issuing a signal proportional to the degree of correlation of said code sequences;
   means for sensing correlation above a predetermined level on said integrating means and for issuing a correlation signal in response thereto, said sensing means issuing a non-correlation signal when the signal from said integrating means is below said predetermined level;
   a data coder receiving said first generated code sequence; and
   means responsive to a correlation signal from said sensing means for interrupting said first code search mechanism, said means responsive to a correlation signal including:
   a first AND gate connected to receive said correlation signal;
   a second AND gate connected to interrupt the operation of said first code searching mechanism in response to an inhibiting signal;
   a third AND gate having an input connected to the output of said first AND gate for issuing an output to said data coder;
   a flip-flop having an input connected to the output of said third AND gate;
   means providing a signal to another input of said flip-flop for initially enabling said first and second AND gates;
   said flip-flop issuing said inhibiting signal to said second AND gate upon incidence of a correlation signal, whereby the operation of said first code searching mechanism is interrupted.

2. An automatic synchronization means as recited in claim 1 further comprising:
   means for transmitting the code sequence from said data coder;
   a second code searching mechanism remote from said one;
   a second code generator for providing a second code sequence substantially similar to said first code sequence;
   means receiving the code sequence from said means for transmitting; a data decoder for sensing synchronization between said second code sequence and the sequence received by said receiving means; and
   means suspending the operation of said second code searching mechanism upon receiving a correlation signal from said data decoder.

3. In a data communication system for communication by digital code sequences, one code sequence being received from a remote location and the second code being locally generated, a device for interrupting a code searching mechanism, comprising:
   an Exclusive OR gate receiving said remotely generated code and said locally generated code and providing a signal output of one type upon matching of the digital code bits and of the opposite type upon mismatch;
   means for integrating the output signals from said exclusive OR gate and issuing a signal proportional to the degree of correlation of said code sequences;
   a Schmitt trigger circuit for sensing correlation above a predetermined level of said integrating means for issuing a correlation signal in response thereto, said circuit issuing a non-correlation signal when the signal from said integrating means is below said predetermined level;
   a first AND gate connected to receive said correlation signal;
   a second AND gate connected to interrupt the operation of said mechanism in response to an inhibiting signal;
   a third AND gate having an input connected to the output of said first AND gate;
   a flip-flop having an input connected to the output of said third AND gate;
   means providing a signal to another input of said flip-flop for initially enabling said first and second AND gates; said flip-flop issuing said inhibiting signal to said second AND gate upon incidence of a correlation signal, whereby the operation of said mechanism is interrupted.

* * * * *